US005860402A

United States Patent [19]
Sakurai et al.

[11] Patent Number: 5,860,402
[45] Date of Patent: Jan. 19, 1999

[54] OIL PUMP DRIVE FOR ENGINE

[75] Inventors: Kenichi Sakurai; Tatsuo Niiyama; Masahiro Uchida, all of Iwata, Japan

[73] Assignee: Yamaha Hatsudoki Kabushiki Kaisha, Iwata, Japan

[21] Appl. No.: 684,702

[22] Filed: Jul. 19, 1996

[30] Foreign Application Priority Data

Jul. 31, 1995 [JP] Japan ................................. 7-195264

[51] Int. Cl.⁶ .............................. F01L 1/02; F02B 75/06; F01M 1/02
[52] U.S. Cl. ................... 123/196 R; 123/90.31; 123/192.2
[58] Field of Search ............................. 123/192.2, 90.31, 123/196 R, 198 C

[56] References Cited

U.S. PATENT DOCUMENTS

| | | | |
|---|---|---|---|
| 4,095,579 | 6/1978 | Iwasa et al. | 123/192.2 |
| 4,538,481 | 9/1985 | Ohta et al. | 123/192.2 |
| 4,615,308 | 10/1986 | Asanomi et al. | 123/198 C |
| 4,793,301 | 12/1988 | Ishikawa | 123/192.2 |
| 5,065,841 | 11/1991 | Takagaki | 123/192.2 |
| 5,113,807 | 5/1992 | Kobayashi | 123/198 C |
| 5,461,940 | 10/1995 | Morita | 123/192.2 |

FOREIGN PATENT DOCUMENTS 57-200744  12/1982  Japan ................................. 123/192.2

*Primary Examiner*—Erick R. Solis
*Attorney, Agent, or Firm*—Knobbe, Martens, Olson & Bear LLP

[57] ABSTRACT

An improved compact oil pump drive arrangement for an internal combustion engine having an auxiliary shaft that is driven by the crankshaft. The oil pump is driven by an oil pump drive shaft that is disposed between the auxiliary shaft and the crankshaft by a helical gear arrangement. The auxiliary drive shaft is also driven by a helical gear arrangement, and the helical gears on the auxiliary drive shaft are of appropriate hands so as to balance the axial thrusts on the auxiliary drive shaft.

16 Claims, 7 Drawing Sheets

5,860,402

OIL PUMP DRIVE FOR ENGINE

BACKGROUND OF THE INVENTION

This invention relates to an internal combustion engine having a compact configuration and more particularly to an oil pump drive arrangement for such an engine.

In conventional engine constructions utilized for powering motor vehicles, a number of engine auxiliaries and accessories are driven from the crankshaft through a wide variety of types of drive mechanisms. For example, in modem high performance internal combustion engines, the engine is provided with twin overhead camshafts for directly operating the valves of the associated cylinder block. These camshafts are driven obviously from the crankshaft through a camshaft drive mechanism.

Many other engine auxiliaries are also driven off of the engine crankshaft, either directly or indirectly. In many instances, these auxiliaries are driven off of pulleys that are mounted on the ends of the crankshaft and which are disposed outwardly of the cam driving mechanism. This, obviously, adds to the overall length of the engine. This can present substantial problems with engine installation in the vehicle. This particularly true if the engine is mounted in a transverse direction in the engine compartment.

There has been proposed, therefore, a type of engine wherein the camshaft drive and overall construction is somewhat simplified by utilizing an intermediate shaft that is driven off of the engine crankshaft and which drives one or more accessories. This invention relates to an improvement in engines of this type.

One of the accessories which must be driven is the oil pump. If the oil pump is driven off of the intermediate shaft rather than directly off of the crankshaft, then the overall arrangement can be simplified to some extent and also the drive for the oil pump need not be positioned at the end of the engine. However, it is also generally the practice to have the intermediate shaft disposed at an elevation that is generally above that of the crankshaft and, hence, is above the crankcase. Although is no problem is the engine is provided with a dry sump system, the oil pump drive and oil pump location can present problems when the engine is of the wet sump type.

It is, therefore, a principal object of this invention to provide an improved oil pump drive arrangement for an internal combustion engine.

It is a further object of this invention to provide an improved internal combustion engine having an intermediate shaft for driving accessories and an improved method for driving the oil pump from such an intermediate shaft.

It is a further object of this invention to provide an improved intermediate shaft oil pump drive for an engine that permits the oil pump to be positioned closer to the crankcase of the engine.

As is generally known, many of the accessory drives for an engine employ flexible transmitters such as belts and/or chains. These mechanisms have a number of advantages over gear trains, particularly in the area of noise. However, in conjunction with driving an oil pump, it is desirable to ensure that the pump drive is more positive, and hence gear drives are normally employed for driving the oil pump.

In engines having intermediate shafts of the type generally described, the intermediate shaft is normally driven from the crankshaft by means of a gear drive. In order to provide a better drive and a somewhat more silent drive, it has been the practice to employ bevel or helical gears for this purpose. A disadvantage of the use of helical gears is, however, that is places an axial force on the shafts, and thrust bearings must be employed for taking the axial thrust so generated.

It is, therefore, a still further object of this invention to provide an improved oil pump drive arrangement wherein the oil pump drive is such that the driving thrusts on the driving shaft are balanced to minimize the need for thrust bearings.

SUMMARY OF THE INVENTION

This invention is adapted to be embodied in an internal combustion engine having a cylinder block with a crankshaft rotatably journaled at one end of the cylinder block and driven by one or more pistons contained within the cylinder block. A crankcase chamber is formed at least in part around the crankshaft. An intermediate shaft is driven off of the crankshaft and is rotatably journaled about an axis that extends parallel to one side of and above the axis of rotation of the crankshaft. An oil pump for the engine is driven off of the intermediate shaft by an oil pump drive shaft that is disposed in the area between the intermediate shaft and the crankshaft so as to provide a compact construction.

In accordance with another feature of the invention, the intermediate shaft and oil pump drive shaft are both driven by helical gear trains. The helical gears on the intermediate shaft that provide the drive from the crankshaft and the drive to the oil pump drive shaft are of such hands so as to balance the axial thrusts on the intermediate shaft.

DETAILED DESCRIPTION OF THE PREFERRED EMBODIMENTS OF THE INVENTION

Figure 1:
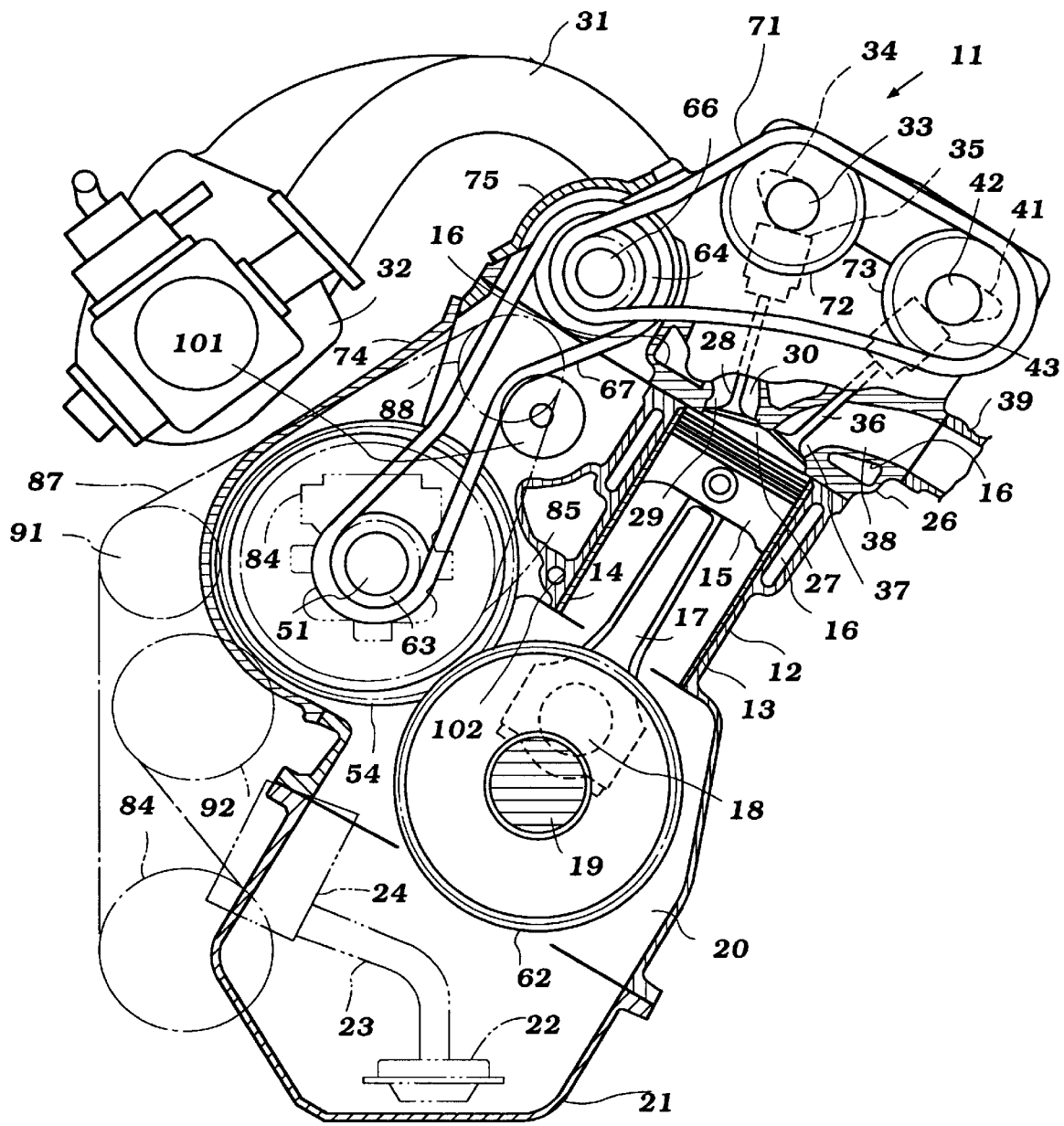
FIG. 1 is an end elevational view of a transversely-mounted engine constructed in accordance with an embodiment of the invention with portions of the engine shown in cross section and portions of the engine's accessory drive arrangement and various other engine components shown in phantom.

Referring now to the drawings and initially to FIG. 1, an internal combustion engine constructed in accordance with an embodiment of the invention is indicated generally by the reference numeral 11. In the illustrated embodiment the engine 11 is depicted as being of the five-cylinder, in-line, four-stroke type though it is to be understood that the invention may also be practiced in conjunction with engines of other configurations. The engine 11 is configured so as to facilitate its use as a propulsion unit for motor vehicles such as an automobile. Particularly the engine 11 is configured for use in a transverse positioning in the engine compartment, although its use is not so limited. However the compact construction of the engine facilitates such applications even though the engine 11 is capable of having more cylinders than normally possible in such transverse engine orientations.

The engine 11 is comprised of a cylinder block 12 which may be formed of a lightweight material such as cast aluminum alloy and includes cylindrical openings in which are press-fitted or otherwise formed sleeves 13 that define cylinder bores 14 in which pistons 15 reciprocate. The cylinder bore axes define a plane that is inclined rearwardly from vertical. As such, the cylinder block 12 slants rearwardly in the engine compartment.

The engine 11 is water cooled. For this reason, a plurality of water jackets 16 are disposed adjacent to and above the cylinder bores 14 so as to cool the engine 11. The pistons 15 are pivotally connected to the small ends of respective connecting rods 17, whose big ends are rotatably journaled about the throw 18 of a crankshaft 19. The crankshaft 19 is rotatably journaled by any suitable means within a crankcase 20. The construction of the crankshaft 19 will be discussed in detail later.

The crankcase 20 is defined by the lower end of the cylinder block 12 and a lower crankcase member 21 which serves the oil pan for the engine 12 and is affixed to the cylinder block 12 by any suitable means. Thus the engine 11 is of the wet-sump lubrication type since the crankcase 20 is used as an oil reservoir. A strainer 22 is disposed within the lower end of the oil pan 21 and communicates through a conduit 23 with an oil pump 24 which is affixed to the lower end of the engine block 12 by any suitable means and pumps lubricating oil through an oil filter 25 and throughout the engine 11 in a manner that will be discussed in detail later.

A cylinder head is indicated by the reference numeral 26 and affixed to the top of the cylinder block 12 in a known manner. The cylinder head 26 has individual recesses 27 that cooperate with the cylinder bores 14 and pistons 15 to define the engine combustion chambers.

Intake valves 28 are slidably supported in the cylinder head 26 and control intake ports 29 that cooperate with the inner ends of intake passages 30 formed in the cylinder head 26. The outer ends of the intake passages 30 terminate at an intake manifold 31, which delivers a supply of atmospheric air and fuel from an induction and charge former 32 to the combustion chambers 27. The induction and charge former 32 mixes a supply of atmospheric air with fuel from a fuel tank (not shown) at a stoichiometric ratio suitable for combustion. The amount of air-fuel charge delivered to the combustion chambers 27 by the induction and charge former 32 is regulated by a throttle valve (not shown).

An overhead intake camshaft 33 is rotatably journaled about its own longitudinal axis within the cylinder head 26 and includes lobe portions 34 for operating the intake valves 28 through tappets 35. The intake camshaft 33 is driven in a manner which will be described in detail later.

Exhaust valves 36 are slidably supported in the cylinder head 26 and control the flow of exhaust gases from the combustion chambers 27 through exhaust ports 37 and into exhaust passages 38. The exhaust passages 38 cooperate with an exhaust manifold 39 and exhaust system (not shown) for discharging the exhaust gases from the engine 11 to the atmosphere and for silencing these discharge gases. The exhaust valves 36 are operated on by the lobes 41 of an overhead exhaust camshaft 42 through tappets 43. The exhaust camshaft 42 is journaled within the cylinder head 26 about an axis that is parallel to the axis of the intake camshaft 33 and driven in a manner to be described in detail later.

The crankshaft 19 will now be described with additional reference to FIG. 2. The crankshaft 19 is rotatably journaled within the crankcase 20 about its own longitudinal axis parallel to the axes of the intake and exhaust camshafts 33 and 42. This rotation drives a flywheel 44 (FIG. 6) that is affixed to the rear end of the crankshaft 19 and whose inertia assists in the smooth operation of the engine 11 at low engine speeds. This end of the engine 11 is refereed to as the "rear end" even though the engine 11 is disposed transversely in the illustrated embodiment. In a longitudinal arrangement this end would normally be the rear end. The flywheel 44 is also associated with a transmission (not shown) for driving a vehicle powered by the engine 11. A crankshaft damper 45 is affixed to the front end of the crankshaft 19 by a bolt 46 and reduces the torsional vibrations of the crankshaft 19 about its axis. These vibrations are caused by the downward motions of the pistons 15 and connecting rods 17 during the expansion strokes for the respective cylinder bores 14.

The crankshaft 19 is provided with five throws 18 which cooperate with the respective cylinder bores 14. The throws 18 are connected to the central shaft 47 of the crankshaft 19 by cheek portions 48 which are associated in pairs with each of the throws 18. The throws 18 are offset from the longitudinal axis of the crankshaft 19, and thus their associated pistons 15 and connecting rods 17 exert outwardly directed forces at each of their associated central shafts 47 when the crankshaft 19 is rotating. These forces are balanced by counterweights that are indicated by the reference numeral 49 and are formed on the ends of the cheeks 48 opposite of the ends to which the throws 18 are affixed. It should be noted, however, that no counterweights 49 are associated with the cheeks of the second cylinder bore 14 from the flywheel 44, and that only a single counterweight 49 is associated with the cheeks 48 of the cylinder bore 14 that is adjacent to the damper 45. Thus, the crankshaft 19 is not completely balanced.

It is well known in the art that additional balancing means are also necessary in order to adequately balance engines that have a certain number of cylinders, such as three or five cylinders. A balancer shaft is frequently employed as the balancing means and is usually positioned underneath the crankshaft and inside the crankcase member. This location for the balancer shaft, however, increases the overall height of the engine and may cause packaging problems for the vehicle which is driven by the engine. It is desirable therefore to utilize a balancer shaft arrangement where the balancer shaft is positioned in a manner that does not increase the height of the engine while still providing an overall compact assembly. This is accomplished by disposing the balancer shaft forwardly of the engine.

Figure 2:
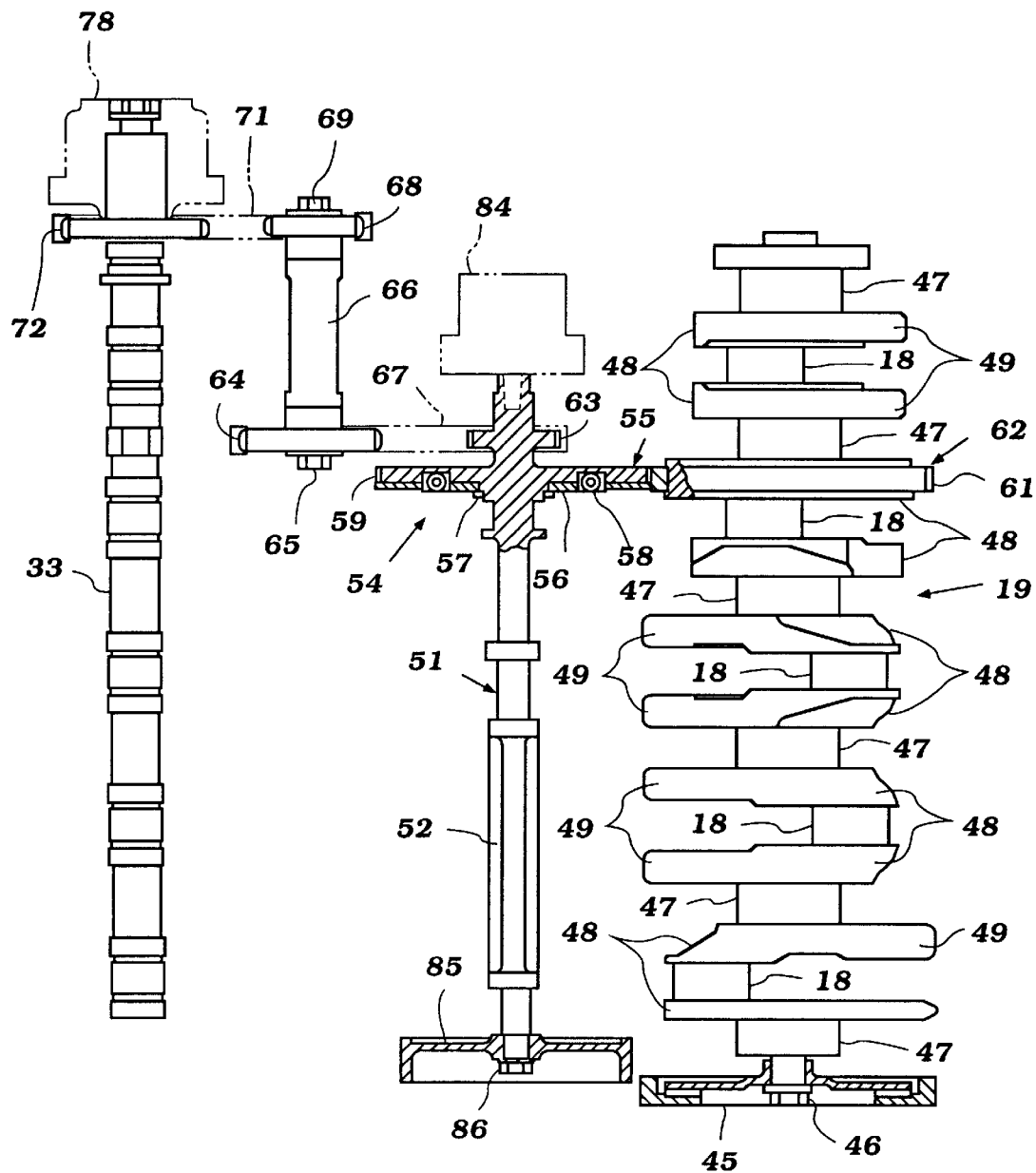
FIG. 2 is a development view of the accessory drive arrangement with portions of the crankshaft and intermediate shaft shown in cross section.
Figure 3:
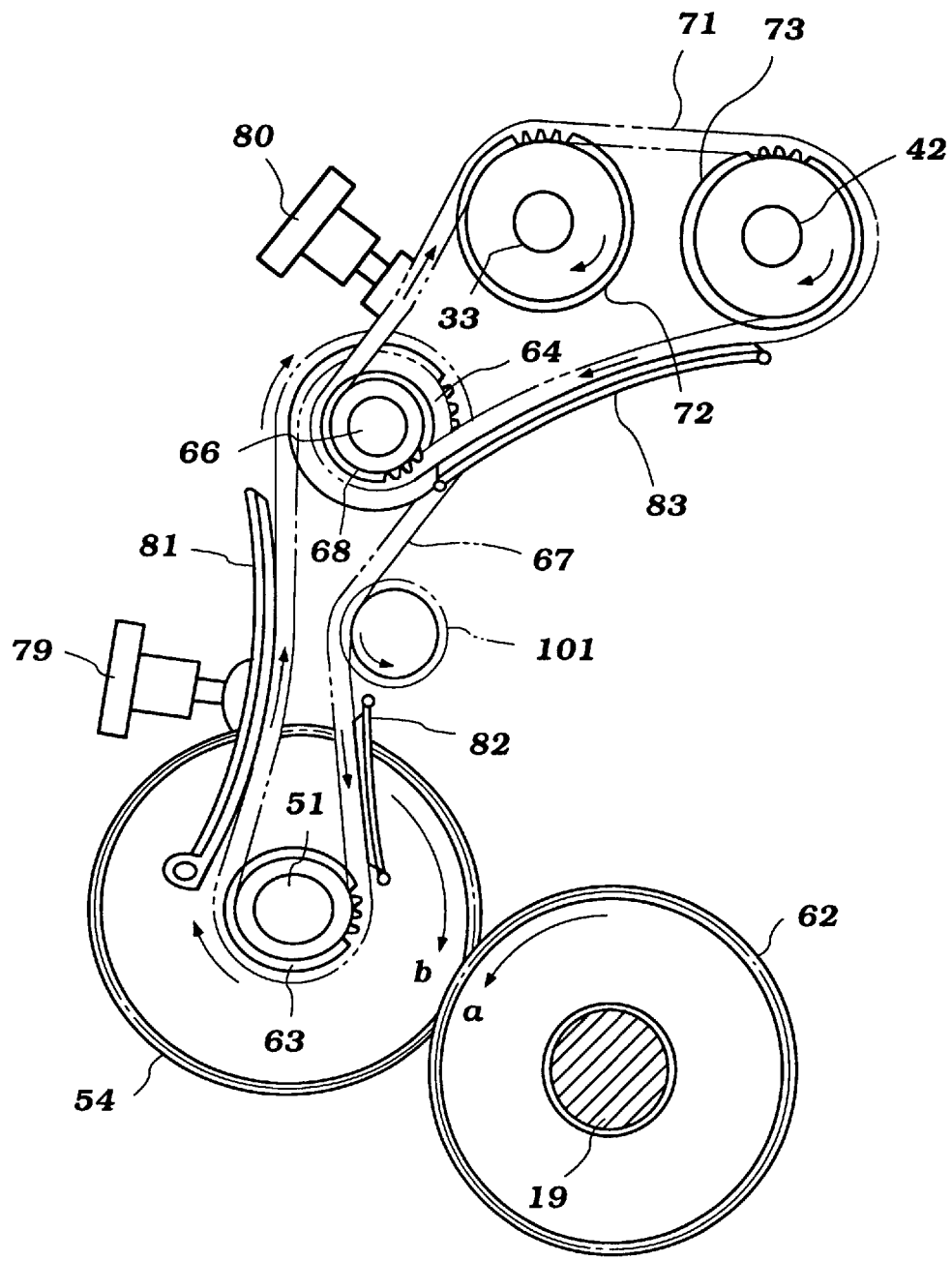
FIG. 3 is an end elevational view of the accessory drive arrangement.

With continued reference primarily to FIGS. 2 and 3, an intermediate shaft is utilized as a balancer shaft and indicated by the reference numeral 51 and rotatably journaled about its longitudinal axis within the engine block 12. This axis is parallel to and offset forwardly and upwardly from the longitudinal axis of the crankshaft 19 and, along with the crankshaft axis, defines a plane that is disposed forwardly of and at some acute angle to the plane defined by the cylinder bores 14. The intermediate shaft 51 includes a front end eccentric balancing mass 52 which serves as the means by which any engine vibration that is not balanced by counterweights 49 is balanced. The operation of the eccentric mass 52 will be discussed later.

The intermediate shaft 51 is driven from the crankshaft 19 by means of a direct gear drive 54 and includes a helical gear assembly 55 that is integrally formed with the intermediate shaft 51. A helical sub-gear 56 is held in association with the gear 55 by a retainer 57 and has limited relative rotation to the gear 55 about the intermediate shaft axis. This rotation is controlled by a biasing spring 58 which acts between the gear 55 and sub-gear 56, both of which are additionally provided with teeth 59 in one-to-one correspondence which extend helically about their outer circumference. The springs 58 tend to rotate the sub-gear 56 such that its teeth 59 can shift in alignment with those of the gear 55 to take up any lash in the direct gear drive 54. As will be seen below, this misalignment acts as an anti-backlash coupling which improves and silences the operation of the intermediate shaft 51.

The helical teeth 59 of the balancer gear assembly 55 intermesh with and are driven by helical teeth 61 of a crankshaft drive gear 62 that comprises one of the cheeks 48 of the crankshaft 19 that is associated with the throw 18 of the second cylinder bore 14 and thus spaced inwardly from the ends of the crankshaft 19.

It has been noted that this throw 18 has no counterweights. The gear 55, howeve, has a cutout portion (not shown) so that it too is unbalanced. This unbalanced mass thus balances for the unbalance of the driving throw 18 of the crankshaft 19. Thus, with additional reference now to FIG. 4, the crankshaft 19 which rotates counterclockwise, as indicated by the arrow a, drives the intermediate shaft 51 in the clockwise direction indicated by the arrow b. This clockwise rotation of the intermediate shaft 51 causes the eccentric mass 52 to generate forces that are equal to the remaining unbalanced forces generated by the crankshaft 19, but act in the opposite direction. These forces thus cancel each other out, meaning that the intermediate shaft 51 effectively balances the engine 11.

With conventional engines it is the practice to utilize the engine to drive a number of accessories which may be required for engine operation or which may be utilized with the vehicle powered by the engine. These accessories are typically driven off of one end of the engine, and thus tend to increase the overall length of the engine. This increase in length is especially undesirable for those associated motor vehicles in which the engine is mounted transversely across the vehicle. It is desirable therefore to utilize an engine configuration where the accessories are driven by a means associated with the engine that in no way adds to the length of the engine. This is accomplished by additionally utilizing the intermediate shaft 51 to drive the accessories in a manner which allows for the mounting of the accessories to the engine 11 at locations that in no way add to the length of the engine 11.

With reference primarily to FIG. 2, the intermediate shaft 51 includes a first accessory drive, namely a camshaft drive sprocket 63 that is integrally formed with the intermediate shaft 51 adjacent to the balancer gear 55 and is thus disposed inwardly relative to the ends of the crankshaft 19. The drive sprocket 63 drives a further sprocket 64 that is affixed by a bolt 65 to one end of a cam driving shaft 66 through a first flexible transmitter drive 67. The cam driving shaft 66 is rotatably journaled within the cylinder head 26 about its own longitudinal axis, that is parallel to the crankshaft axis.

A further sprocket 68 is affixed by a bolt 69 to the other end of the cam driving shaft 66 and drives a second flexible transmitter device 71, which in turn drives sprockets 72 and 73 that are associated with the overhead camshafts 33 and 42, respectively. Thus, the overhead camshafts 33 and 42 are driven by a camshaft drive arrangement that is disposed entirely forwardly of the engine 12 in a compact manner that does not add to the length of the engine 11. This arrangement is covered by covers 74 and 75, which are affixed by any suitable means to the engine block 12 and cylinder head 26, respectively.

It should be noted at this time that the camshaft sprockets 72 and 73 drive the camshafts 33 and 42 through a variable valve timing mechanism 78, shown in phantom in FIG. 2. This variable valve timing mechanism 78 allows the cam timing to be modified so as to provide optimum engine performance under a variety of engine running conditions.

As is well known, the camshafts 33 and 42 are normally driven at one half crankshaft speed. Usually this is accomplished by means of a two-to-one gear or sprocket reduction between the crankshaft 19 and the camshafts 33 and 42. Such large reductions in a single drive tend to cause the gears and/or sprockets associated with the camshafts 33 and 42 to be unduly large. In accordance with a feature of this invention, a portion of the speed reduction occurs between the sprockets 63 and 64 and the remainder of the reduction between the sprockets 68 and 72 and 73 on the camshafts 33 and 42 such that the two combined ratios give the desired one-half speed reduction.

It is also seen in FIG. 3 that a pair of adjustable, flexible transmitter tensioners 79 and 80 are associated with the first and second flexible transmitter drives 67 and 71, respectively. The first tensioner 79 is associated with the first flexible transmitter drive 67 and operates a tension rail 81 that is pivotally connected at one end to the engine block 12 on the forward side of the transmitter drive 67. A guide rail 82 is also associated with the transmitter drive 67 on the side opposite of the tension rail 81. The second tensioner 80 acts directly against the outer periphery of the second flexible transmitter drive 71 above the cam driving shaft 66. A guide rail 83 is also associated with the second flexible transmitter drive 71.

The intermediate shaft 51 is also used to drive a plurality of additional engine and other accessories. A power steering pump is indicated by the reference numeral 84 and is directly driven off of the rearward end of the intermediate shaft 51. A second accessory drive element is composed of a pulley 85 that is affixed to the forward end of the intermediate shaft 51 by a bolt 86. The pulley 85 drives a serpentine belt 87 which transmits drive to a number of pulleys associated with various engine and other accessories.

An alternator 88 is affixed to the lower front face of the engine block 12, forward of the plane defined by the cylinder bores 14 and above the plane defined by the crankshaft and intermediate shaft axes, and driven off of the belt 87, as is an air compressor 89 that is affixed to the lower forward portion of the crankcase member 21 beneath the plane defined by the crankshaft and intermediate shaft axes. An idler pulley 91 is associated with the belt 87 above the air compressor 89 and utilized to provide clearance for the belt 87 from the engine 11. A torsion pulley 92 is also affixed to the engine 11 between the air compressor 89 and idler 91, and maintains proper torsion in the belt 87.

Figure 4:
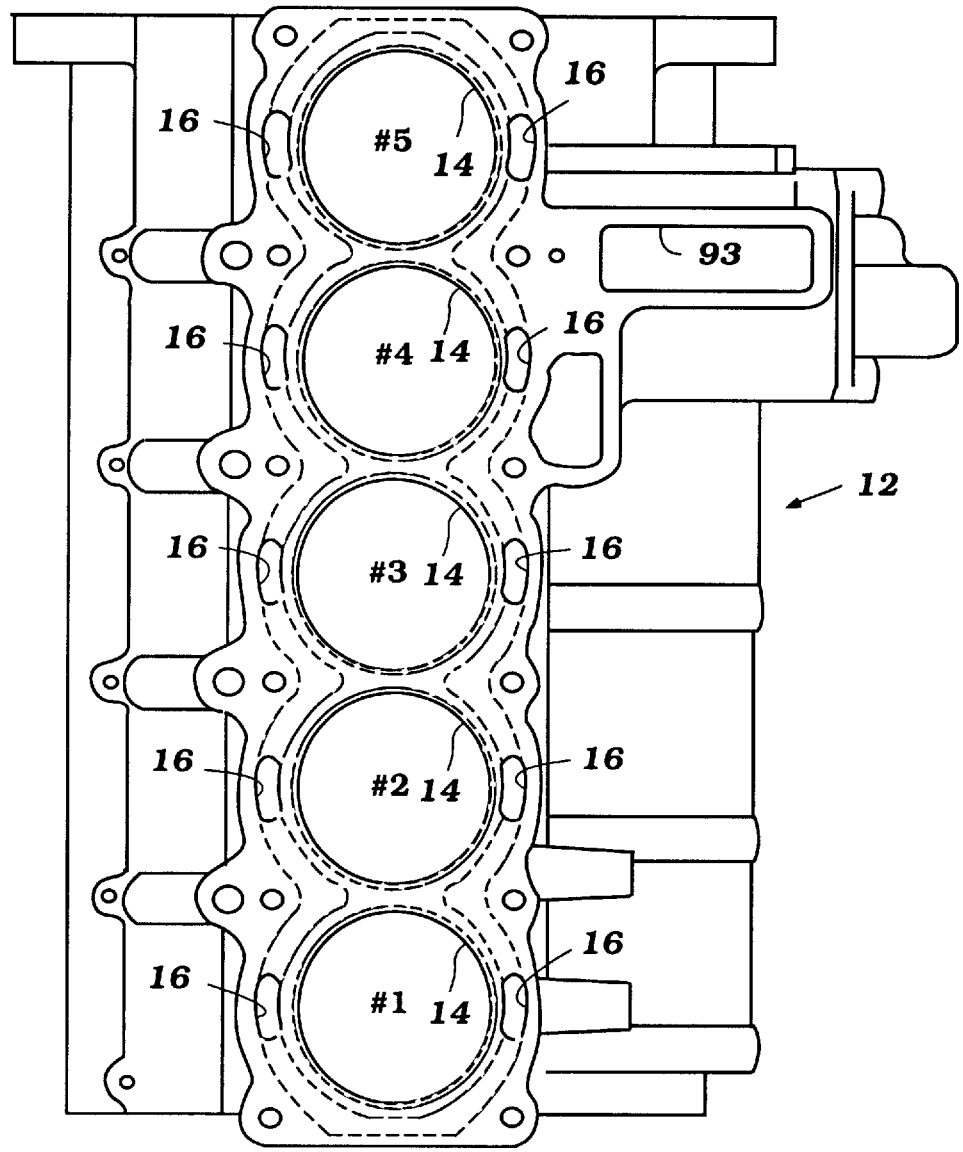
FIG. 4 is a top plan view of an engine block utilized in conjunction with the accessory drive arrangement of FIGS. 1–4.

FIG. 4 is a top plan view of the engine block 12 used in association with the drive arrangement 54. A vertical tunnel 93 is disposed forwardly of and spaced between the numbers four and five cylinder bores 14 which are at the rear or flywheel end of the engine 11. The tunnel 93 is in alignment with the camshaft drive sprocket 63 of the intermediate shaft 51 and the first flexible transmitter drive 67 extends through the tunnel 93 for driving the cam driving shaft 66.

The manner by which the oil pump pumps lubricating oil throughout the engine will now be discussed in detail. The intermediate shaft is used to drive a number of engine accessories as already described. It is also desirable to utilize the intermediate shaft for driving the oil pump. A problem exists, however, in that the intermediate shaft is positioned above the crankshaft. This is well above the oil level in a wet sump type engines as is used above. Thus, it is highly desirable to position the oil pump in close proximity to the crankcase and below the crankshaft. Thus, a significant distance must be traversed by the oil drive arrangement between the intermediate shaft and the oil pump which may result in packaging problems and a complicated drive arrangement with the oil pump positioned at a less than ideal location.

In accordance with a feature of this invention eliminates these problems by providing an oil pump drive arrangement that is both simple and compact and allows for the positioning of the oil pump in close proximity to the crankcase.

Figure 5:
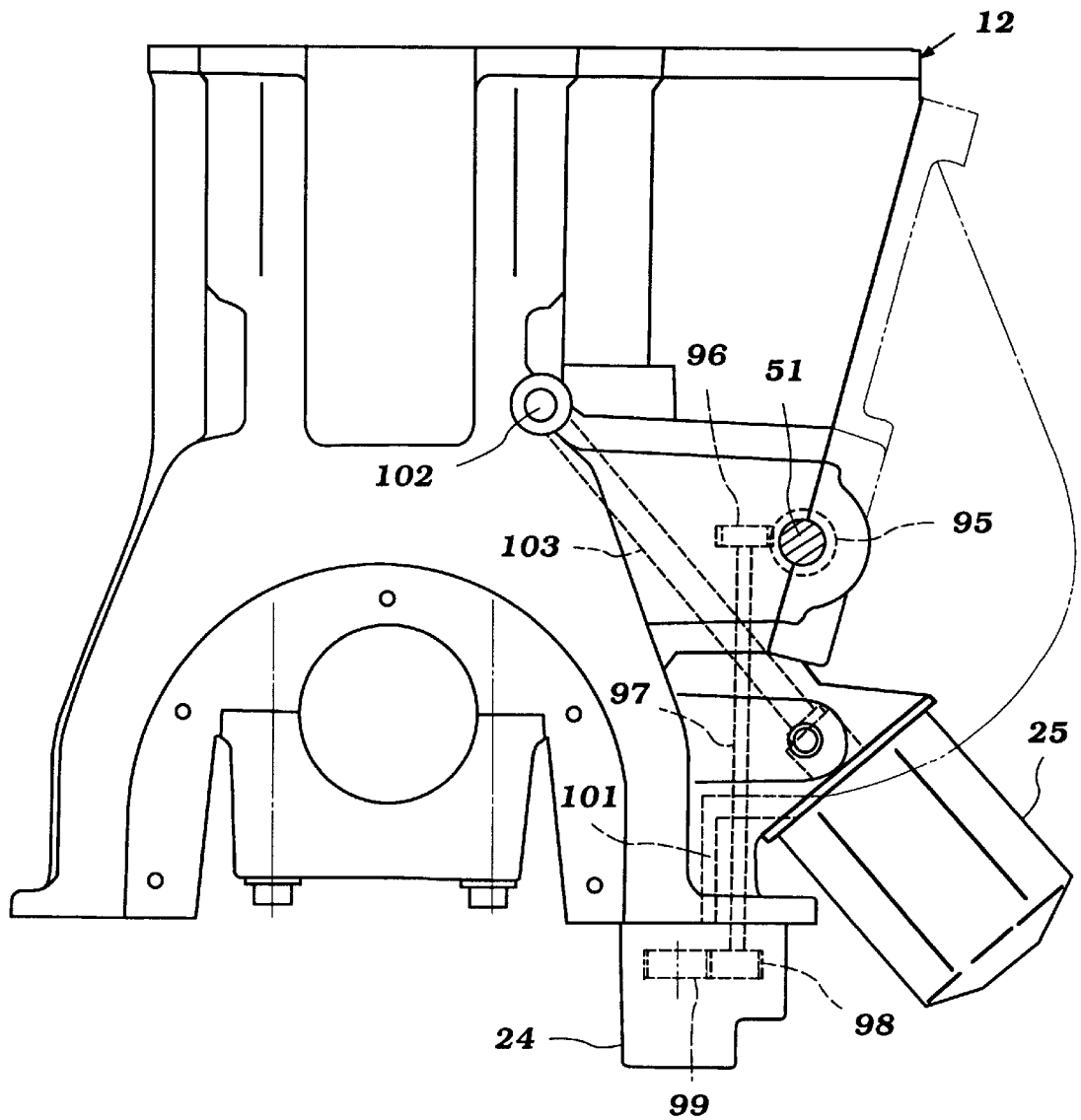
FIG. 5 is an end elevational view of the engine block of FIG. 4 with portions of the oil pump drive shown in phantom.
Figure 6:
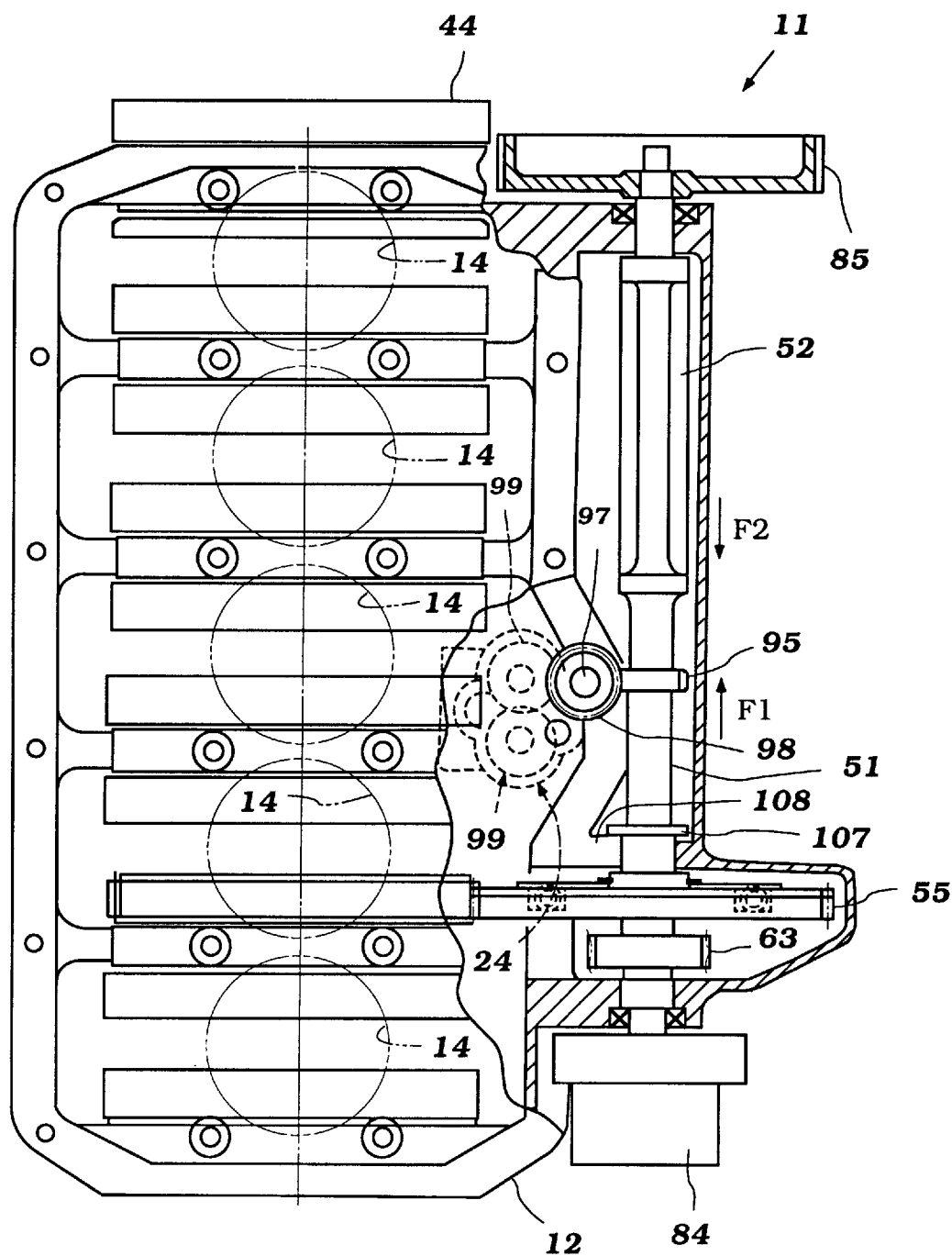
FIG. 6 is a bottom plan view of the engine cylinder block with portions of the block removed to show the oil pump driving arrangement.
Figure 7:
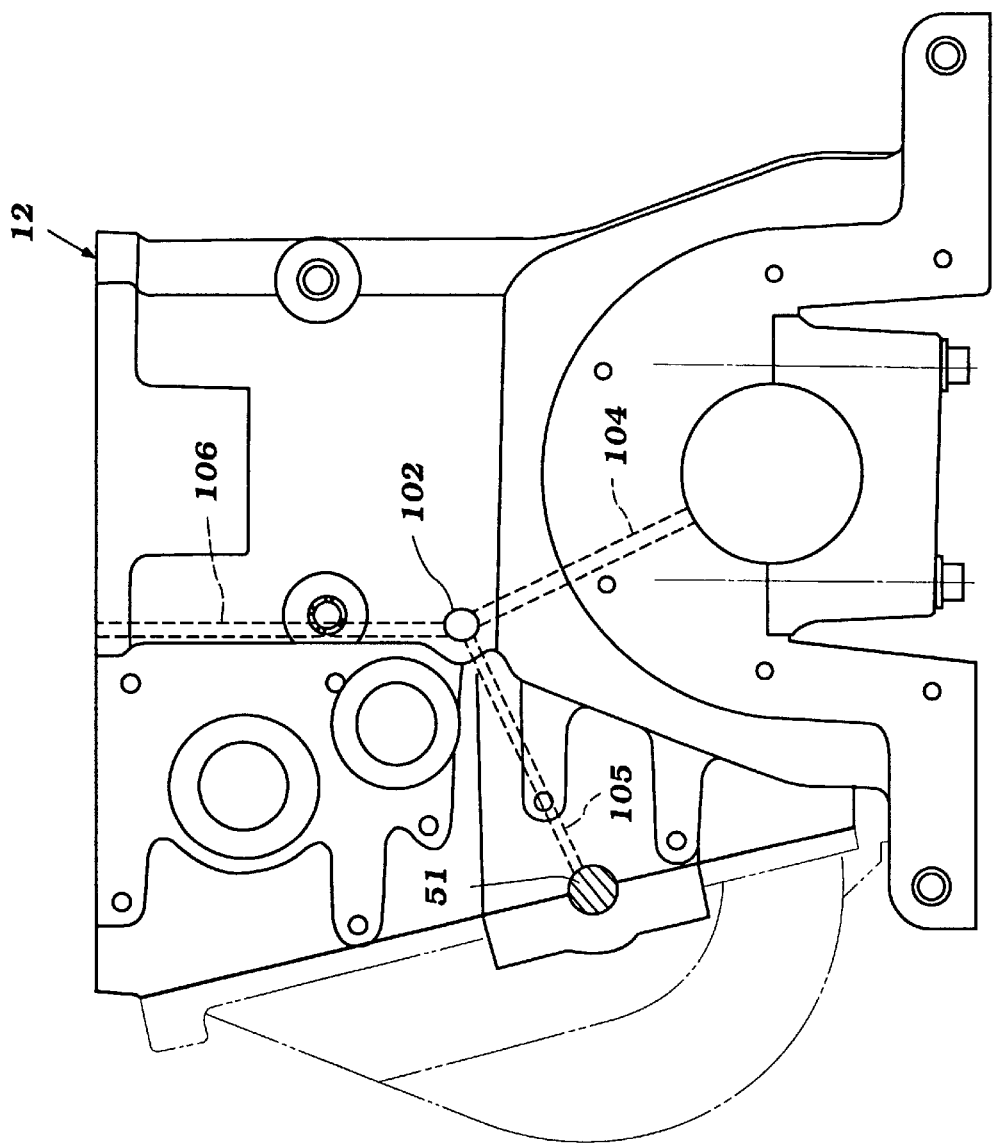
FIG. 7 is a side elevational view of the engine cylinder block with portions of the engine lubrication system shown in phantom.

With reference now to FIGS. 5–7 a helical gear 95 is affixed to the intermediate shaft 51 between the balancing mass 52 and the crankshaft driven helical gear assembly 55. The gear 95 intermeshes and drives a further helical gear 96 that is affixed to the upper end of an oil pump drive shaft 97 which shaft 97 is disposed in the area between the crankshaft 19 and intermediate shaft 51. It should be noted at this time that the helical gears 95 and 96 are of specific hands relative to the helical gears 55 and 62 for a reason to be described later.

The drive shaft 97 is rotatably journaled within the engine block 12 about its own longitudinal axis which extends generally perpendicularly to the axes of rotation of the crankshaft 19 and intermediate shaft 51. The drive shaft 97 extends downwardly and terminates within the oil pump 24 which, as previously stated, is affixed to the lower end of the engine block 12 in direct communication with the crankcase 20. An oil pump driving gear 98 is affixed to the lower end of the drive shaft 97 and drives a pair of intermeshed pump gears 99 that are rotatably journaled within the oil pump 24. These gears 99 pump the oil that is supplied from the crankcase 20 through a conduit 101 that is formed in the engine block 12 and opens to the oil filter 25. From the oil filter 25 the oil is delivered to a main oil gallery 102 through a gallery supply conduit 103. As seen in FIG. 7 the gallery 102 then supplies lubricating oil to the crankshaft 19, intermediate shaft 51 and valve train through a crankshaft supply conduit 104, intermediate supply conduit 105 and valve train supply conduit 106 respectively. Thus, it is seen that the oil adequately lubricates the engine 11 before draining into the crankcase 20 for recirculation by any suitable manner.

With reference now to FIG. 6, it should be noted that the driving of the intermediate shaft 51 by the intermeshing of the helical gears 55 and 62 tends to impart an axial load F1 on the intermediate shaft 51. Conventionally, thrust bearings are employed as the means of negating the effect of this axial load on the operation of the intermediate shaft 51. However, with the present embodiment, the axial load F1 induced by the intermeshing of the helical gears 55 and 62 is balanced by an axial force F2 acting in the opposite direction. This balancing force F2 is induced by the intermeshing of the helical gears 95 and 96 which are of appropriate hands relative to the gears 55 and 62 and therefore impart the axial load F2 in the opposite direction. Thus, the longitudinal intermediate shaft balance is maintained though a single thrust bearing 107 is utilized in association with the intermediate shaft 51 and acts against a lip 108 of the engine block 12 so as to maintain proper intermediate shaft alignment and operation in those circumstances where an intermediate shaft imbalance could occur such as, for example, operation under transient engine running conditions.

It should be readily apparent that the above oil pump drive arrangement is of a compact simple construction which allows for the positioning of the oil pump in close proximity to the crankcase and additionally maintains proper intermediate shaft balance. Of course, the foregoing description is that of preferred embodiments of the invention, and various changes and modifications may be made without departing from the spirit and scope of the invention, as defined by the appended claims.

What is claimed is:

1. An internal combustion engine comprised of a cylinder block having at least one cylinder bore formed therein, a crankshaft journaled for rotation at one end of said cylinder block and driven by a piston reciprocating in said cylinder bore, an intermediate shaft journaled for rotation in said cylinder block at one side thereof about a rotational axis that is parallel to and offset from the axis of rotation of said crankshaft, a cylinder head affixed to said cylinder block at the end opposite said crankshaft and closing said cylinder bore, a camshaft rotatably journaled in said cylinder head about an axis parallel to the crankshaft axis and the axis of rotation of the intermediate drive shaft, a camshaft drive for driving said camshaft from said intermediate drive shaft, and an oil pump drive shaft driven by said intermediate shaft and disposed in the area between said intermediate shaft and said crankshaft.

2. An internal combustion engine as set forth in claim 1, wherein the crankshaft rotates in a crankcase fixed to the lower side of the cylinder block and forming an oil reservoir for said engine.

3. An internal combustion engine as set forth in claim 2, wherein the oil pump is disposed at the lower end of the cylinder block and in direct communication with the crankcase chamber.

4. An internal combustion engine as set forth in claim 3, wherein the oil pump drive shaft extends generally perpendicularly to the axes of rotation of the crankshaft and the intermediate shaft.

5. An internal combustion engine as set forth in claim 1, further including a cam driving shaft journaled for rotation about an axis parallel to the axis of the camshaft at one side of the engine and wherein the camshaft drive comprises a first flexible transmitter drive means for driving said cam driving shaft from said intermediate drive shaft and second flexible transmitter means for driving said camshaft from said cam driving shaft.

6. An internal combustion engine as set forth in claim 5, wherein there are provided a pair of camshafts rotatably journaled about parallel axes by the cylinder head.

7. An internal combustion engine as set forth in claim 6, wherein the second flexible transmitter means drives both of the camshafts from the cam driving shaft.

8. An internal combustion engine comprised of a cylinder block having at least one cylinder bore formed therein, a crankshaft journaled for rotation at one end of said cylinder block and driven by a piston reciprocating in said cylinder bore, said crankshaft rotating in a crankcase chamber formed in part by a crankcase fixed to the lower side of said cylinder block and forming an oil reservoir for said engine, an intermediate shaft journaled for rotation at one side of said cylinder block about a rotational axis that is parallel to and offset from the axis of rotation of said crankshaft and driven by a pair of intermeshing helical gears, an oil pump disposed at the lower end of said cylinder block and in direct communication with said crankcase chamber, and an oil pump drive shaft for driving said oil pump, said oil pump drive shaft extending generally perpendicularly to the axes of rotation of said crankshaft and said intermediate shaft in the area between said intermediate shaft and said crankshaft and driven from said intermediate shaft by a pair of intermeshing helical gears.

9. An internal combustion engine as set forth in claim 8, wherein the helical gear on the intermediate shaft driven by the crankshaft and the helical gear on the intermediate shaft driving the oil pump drive shaft have hands for balancing the axial thrust on said auxiliary drive shaft.

10. An internal combustion engine as set forth in claim 9, further including a cylinder head affixed to the cylinder block at the end opposite the crankshaft and closing the cylinder bore and a camshaft rotatably journaled in said cylinder head about an axis parallel to the crankshaft axis and the axis of rotation of the intermediate drive shaft and driven from the intermediate drive shaft.

11. An internal combustion engine having a cylinder block defining at least one cylinder bore, a crankshaft rotatably journaled at one end of said cylinder block and driven by a piston reciprocating in said cylinder bore, an intermediate drive shaft rotatably journaled at one side of said cylinder block about an axis that extends parallel to the axis of rotation of said crankshaft, a first pair of helical gears for driving said intermediate drive shaft from said crankshaft, an oil pump drive shaft for driving an oil pump, a second set of helical gears for driving said oil pump drive shaft from said intermediate drive shaft, the helical gears on said intermediate drive shaft driven by said crankshaft and driving said oil pump drive shaft being of appropriate hands for balancing the axial thrusts on said intermediate drive shaft.

12. An internal combustion engine as set forth claim 11, wherein the intermediate shaft comprises a balance shaft having a balance mass affixed thereto.

13. An internal combustion engine as set forth in claim 12 wherein the balancing mass is formed on only one end of the intermediate shaft.

14. An internal combustion engine as set forth in claim 13, wherein an accessory drive element is disposed at one end of the intermediate shaft for driving an engine accessory.

15. An internal combustion engine as set forth in claim 14, further including an accessory drive element disposed at the other end of the intermediate shaft for driving another engine accessory.

16. An internal combustion engine as set forth in claim 15, wherein the balance mass is disposed between the ends of the intermediate shaft and in juxtaposition to one of the accessory drive elements.

\* \* \* \* \*